United States Patent
Abro et al.

(10) Patent No.: US 12,472,858 B2
(45) Date of Patent: Nov. 18, 2025

(54) MULTI-PURPOSE INTERIOR CABIN LID FOR VEHICLE

(71) Applicant: Toyota Motor Engineering & Manufacturing North America, Inc., Plano, TX (US)

(72) Inventors: Lauren M. Abro, West Bloomfield, MI (US); Tina L. Brinkel, Ann Arbor, MI (US); Warren Chou, Ann Arbor, MI (US)

(73) Assignees: TOYOTA MOTOR ENGINEERING & MANUFACTURING NORTH AMERICA, INC, Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 405 days.

(21) Appl. No.: 18/063,123

(22) Filed: Dec. 8, 2022

(65) Prior Publication Data

US 2024/0190318 A1 Jun. 13, 2024

(51) Int. Cl.
*B60N 3/00* (2006.01)

(52) U.S. Cl.
CPC .................... *B60N 3/001* (2013.01)

(58) Field of Classification Search
CPC . B60N 3/001; B60N 3/002; B60P 3/34; B60P 3/36; B60R 11/06; B60R 9/06; A47B 31/06
USPC .............. 296/37.6, 37.1, 37.13, 1.07, 26.08; 108/44
See application file for complete search history.

(56) References Cited

U.S. PATENT DOCUMENTS

| | | | | |
|---|---|---|---|---|
| 3,338,620 A | * | 8/1967 | Cauvin | B60N 3/001 224/524 |
| 3,726,422 A | * | 4/1973 | Zelin | B60R 5/04 36/3 R |
| 4,236,461 A | * | 12/1980 | Barksdale | A47B 5/06 5/119 |
| 4,993,088 A | * | 2/1991 | Chudik | A47C 17/80 5/118 |
| 5,634,408 A | * | 6/1997 | Jarkowski | B60P 1/003 224/404 |
| 5,649,734 A | | 7/1997 | Speis | |
| 5,730,066 A | * | 3/1998 | Auten | B60N 3/001 108/44 |
| 6,641,190 B2 | | 11/2003 | Kirchhoff | |

(Continued)

*Primary Examiner* — Amy R Weisberg
*Assistant Examiner* — Wenwei Zhuo
(74) *Attorney, Agent, or Firm* — Jordan IP Law, LLC

(57) ABSTRACT

A vehicle and multi-purpose interior cabin lid for a vehicle that has use as a rear wall cover for one or more storage compartments in the interior cabin, a tailgate extension connectable to a vehicle tailgate, and a portable, freestanding table. The multi-purpose interior cabin lid member includes a base member, one or more coupling members, and one or more leg members coupled to the base member. The one or more coupling members are operable to selectively couple the base member in the interior cabin as a cover for the one or more storage compartments, and selectively couple the base member to a vehicle tailgate to serve as a tailgate extension. The one or more leg members are selectively coupled to the base member for movement between a retracted operating state when the base member is in an undetached operating state, and a deployed state to vertically support the base member on a support surface.

7 Claims, 14 Drawing Sheets

(56) References Cited

U.S. PATENT DOCUMENTS

| | | | |
|---|---|---|---|
| 7,309,202 B1 | 12/2007 | Anderson | |
| 7,628,439 B1 | 12/2009 | Strong | |
| 10,160,364 B2 * | 12/2018 | Howe | A47B 5/06 |
| 10,266,090 B2 | 4/2019 | Howe | |
| 10,406,958 B2 * | 9/2019 | Fulton | B60J 5/101 |
| 11,801,737 B2 * | 10/2023 | Harris | B60J 7/141 |
| 11,975,688 B2 * | 5/2024 | Harmon | B60J 5/02 |
| 2005/0156445 A1 * | 7/2005 | Mains | B60N 3/001 |
| | | | 296/37.16 |
| 2021/0146816 A1 | 5/2021 | Schanz | |
| 2022/0144352 A1 * | 5/2022 | Nelson | A47B 3/10 |

* cited by examiner

MULTI-PURPOSE INTERIOR CABIN LID FOR VEHICLE

TECHNICAL FIELD

One or more embodiments relate generally to a vehicle, and multi-purpose interior cabin lid for a vehicle that is selectively convertible between a rear wall cover in the interior of the vehicle, a detachable cover for a storage bin in the interior cabin, a tailgate extension, and a portable, freestanding table.

BACKGROUND

Portable tables are useful when engaged in outdoor social activities such as camping or tailgating. There is a concern of a manner of stowing such portable tables in a vehicle in order to prevent damage to the vehicle or the portable table.

BRIEF SUMMARY

A vehicle includes a multi-purpose interior cabin lid member that is selectively convertible between a plurality of uses such as a rear wall cover in the interior of the vehicle, a detachable cover for a storage bin in the interior cabin, a tailgate extension, and a portable, freestanding table.

In accordance with one or more embodiments set forth, shown, and described herein, the multi-purpose interior cabin lid has a multi-purpose configuration to facilitate its use as one or more of: a mountable rear wall cover in the interior cabin, a detachable lid for a storage bin, as a tailgate extension connected to a tailgate, and as a freestanding table In accordance with one or more embodiments, an example vehicle comprises one or more of the following: a vehicle body defining an interior cabin with a rear wall; a tailgate attached to the vehicle body; and a multi-purpose interior cabin lid member that includes: a base member having one or more coupling members operable to selectively couple the base member to the rear wall and also selective couple the base member to the tailgate as a tailgate extension, and one or more leg members selectively coupled to the base member for movement between a retracted operating state and a deployed state to vertically support the base member on a support surface.

In accordance with the example vehicle, a storage bin is provided having one or more storage compartments in the interior cabin to receive one or more storage items therein.

In accordance with the example vehicle, the base member encloses the one or more storage compartments in an undetached operating state.

In accordance with the example vehicle, the base member exposes the one or more storage compartments in a detached operating state.

In accordance with the example vehicle, the base member comprises an upper planar surface exposed to the interior cabin in the undetached operating state and operable as a tabletop in the detached operating state.

In accordance with the example vehicle, the base member comprises a bottom planar surface concealed from the interior cabin in the undetached operating state.

In accordance with the example vehicle, the one or more coupling members extend from the bottom planar surface.

In accordance with the example vehicle, the one or more leg members are coupled to the bottom planar surface.

In accordance with one or more embodiments, another example vehicle comprises one or more of the following: a vehicle body defining an interior cabin; a storage bin having one or more storage compartments in the interior cabin to receive one or more storage items therein; a tailgate attached to the vehicle body; and a multi-purpose interior cabin lid member that includes: a base member having one or more coupling members operable to selectively couple the base member in the interior cabin and also selective couple the base member to the tailgate as a tailgate extension, and one or more leg members selectively coupled to the base member for movement between a retracted operating state and a deployed state to vertically support the base member on a support surface.

In accordance with the example vehicle, the base member encloses the one or more storage compartments in an undetached operating state.

In accordance with the example vehicle, the base member exposes the one or more storage compartments in a detached operating state.

In accordance with the example vehicle, the base member comprises an upper planar surface exposed to the interior cabin in the undetached operating state and operable as a tabletop in the detached operating state.

In accordance with the example vehicle, the base member comprises a bottom planar surface concealed from the interior cabin in the undetached operating state.

In accordance with the example vehicle, the one or more coupling members extend from the bottom planar surface.

In accordance with the example vehicle, the one or more leg members are coupled to the bottom planar surface.

In accordance with one or more embodiments, a multi-purpose interior cabin lid for a vehicle having an interior cabin with a rear wall, a tailgate, and one or more storage compartments in the interior cabin to receive one or more storage items therein, the multi-purpose interior cabin lid member comprising one or more of the following: a base member having one or more coupling members operable to selectively couple the base member in the interior cabin and also selective couple the base member to the tailgate as a tailgate extension; and one or more leg members selectively coupled to the base member for movement between a retracted operating state and a deployed state to vertically support the base member on a support surface.

In accordance with the example multi-purpose interior cabin lid, the base member encloses the one or more storage compartments in an undetached operating state.

In accordance with the example multi-purpose interior cabin lid, the multi-purpose interior cabin lid member exposes the one or more storage compartments in a detached operating state.

In accordance with the example multi-purpose interior cabin lid, the multi-purpose interior cabin lid member comprises an upper planar surface exposed to the interior cabin in the undetached operating state and operable as a tabletop in the detached operating state.

In accordance with the example multi-purpose interior cabin lid, the multi-purpose interior cabin lid member comprises a bottom planar surface concealed from the interior cabin in the undetached operating state.

In accordance with the example multi-purpose interior cabin lid, the one or more coupling members extend from the bottom planar surface.

In accordance with the example multi-purpose interior cabin lid, the one or more leg members are coupled to the bottom planar surface.

In accordance with the example multi-purpose interior cabin lid, the one or more members, when selectively moved to the deployed state, vertically support the base member on a support surface as a freestanding table.

BRIEF DESCRIPTION OF THE SEVERAL VIEWS OF THE DRAWINGS

The various advantages of the exemplary embodiments will become apparent to one skilled in the art by reading the following specification and appended claims, and by referencing the following drawings, in which:

DETAILED DESCRIPTION

Figure 1A:
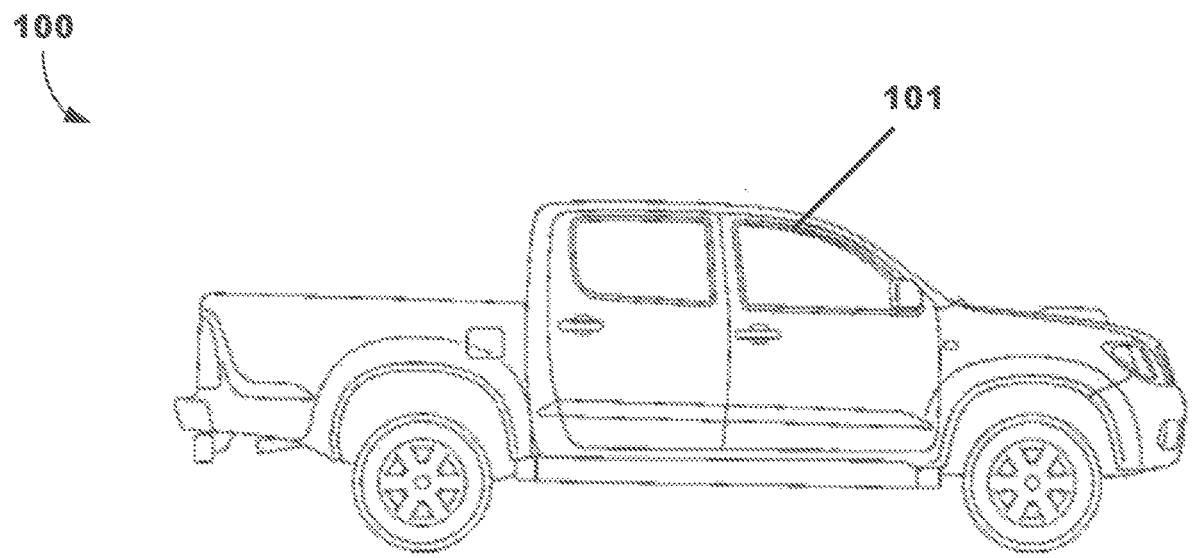
FIGS. 1A and 1B respectively illustrate a side view and a rear view of an example vehicle, in accordance with one or more embodiments set forth, shown, and described herein.
Figure 1B:
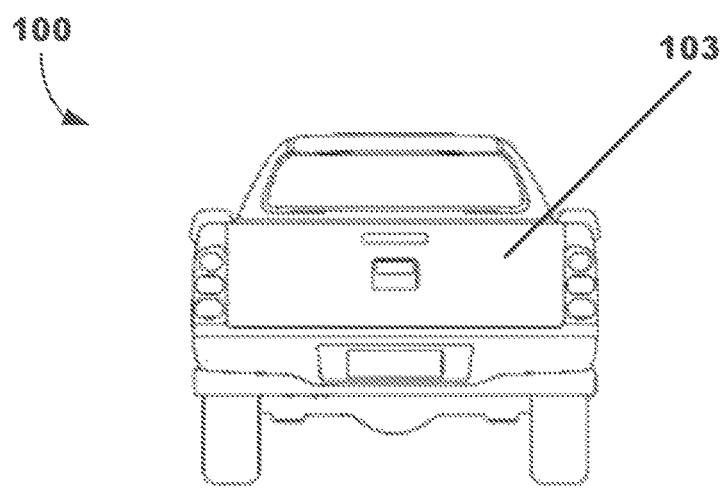
Figure 2A:
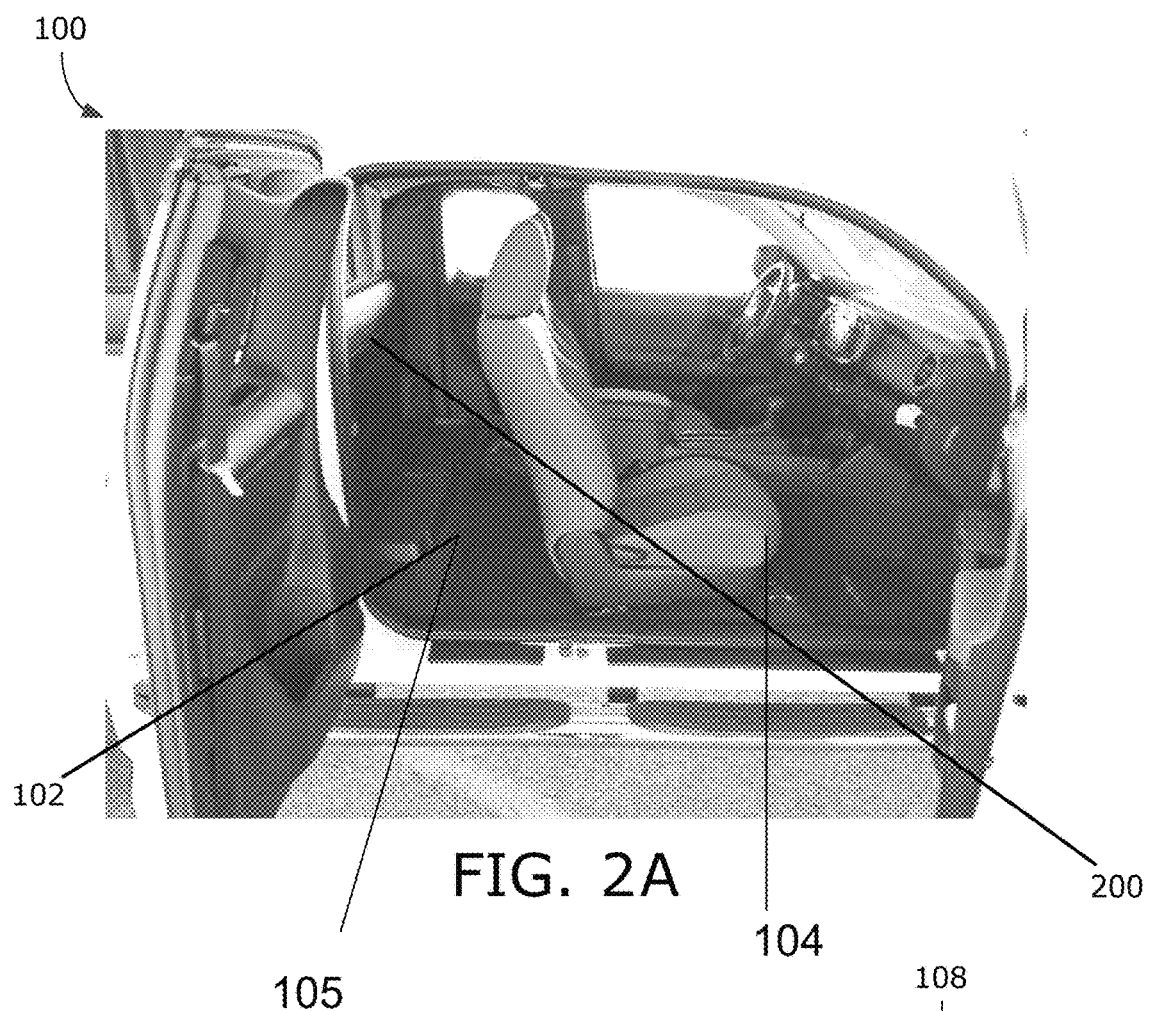
FIGS. 2A and 2B respectively illustrate a side view and a perspective view of an interior cabin of the example vehicle of FIG. 1, with a multi-purpose interior cabin lid member in an undetached operating state on a rear wall of the interior cabin.
Figure 2B:
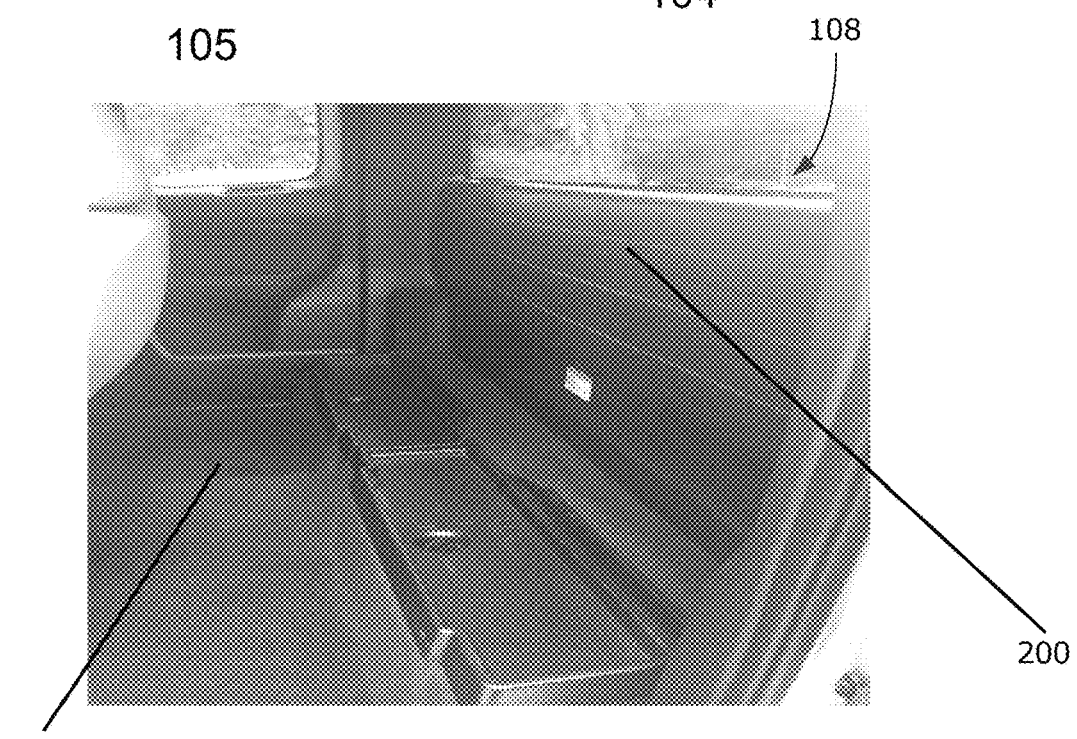
Figure 3A:
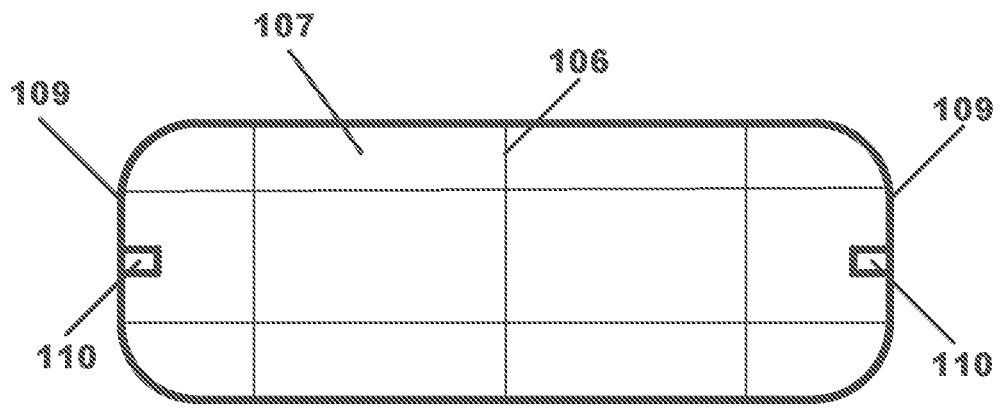
FIGS. 3A and 3B respectively illustrate a front view of an exposed vehicle storage bin by which the example multi-purpose interior cabin lid is removed, and a front view of the example multi-purpose interior cabin lid connected to the vehicle storage bin, in accordance with one or more embodiments set forth, shown, and described herein.
Figure 3B:
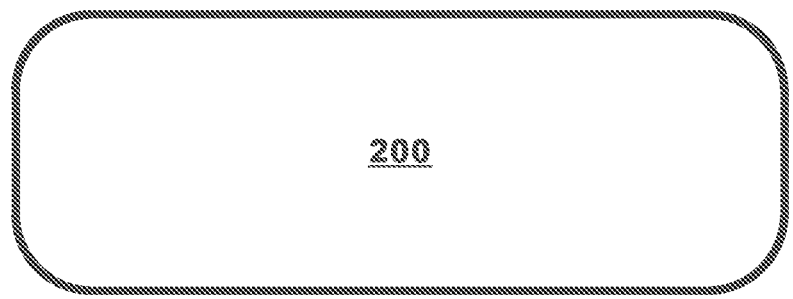
Figure 4:
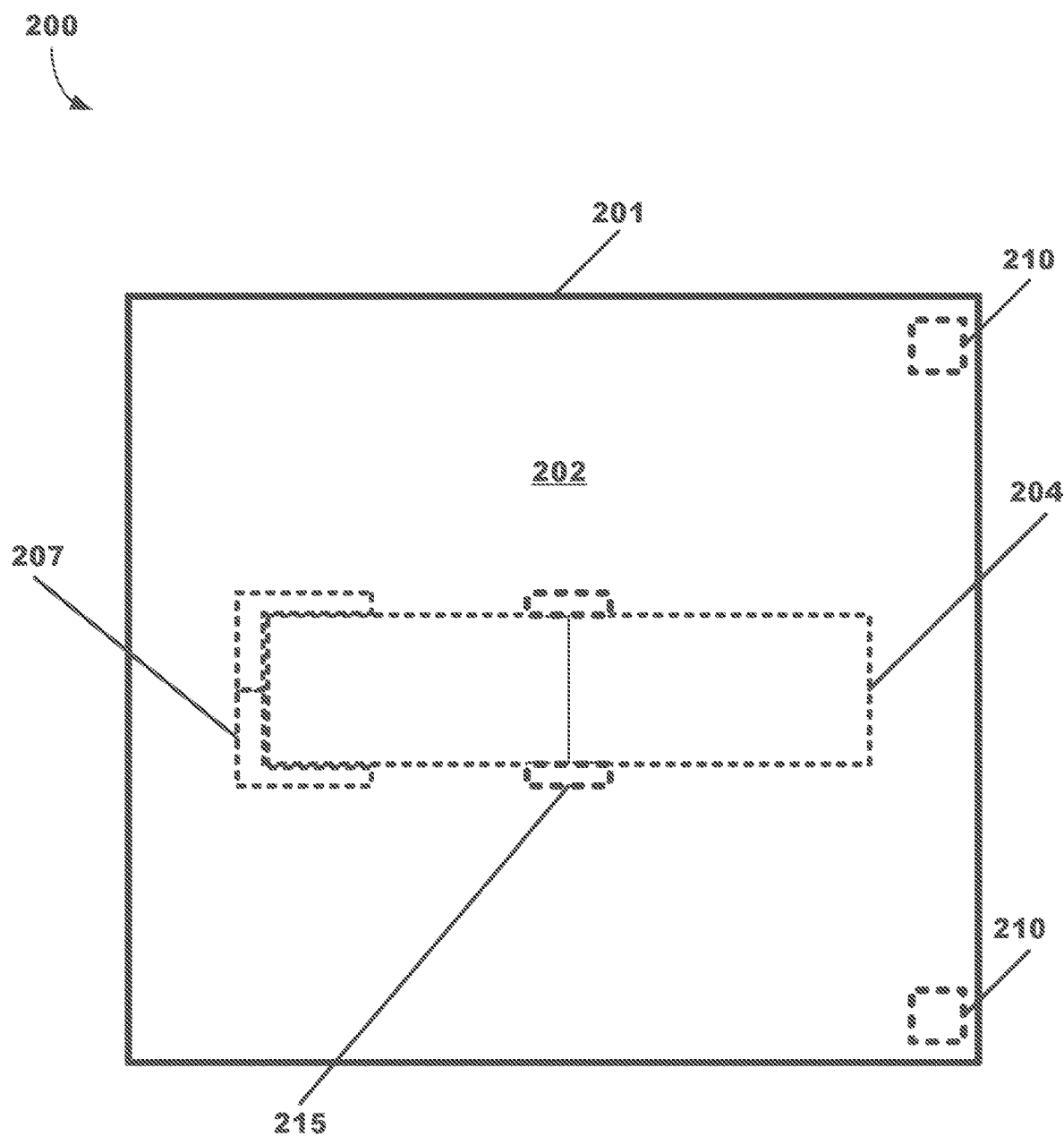
FIG. 4 illustrates a front view of the example multi-purpose interior cabin lid of FIG. 3B.

Turning to the figures, which illustrates an example multi-purpose interior cabin lid 200 for a vehicle 100, in accordance with one or more embodiments. In accordance with one or more embodiments, a "vehicle" may be in reference to any form of motorized transport. In accordance with one or more embodiments, the vehicle may comprise an automobile. Embodiments, however, are not limited thereto, and thus, this disclosure contemplates the vehicle comprising a watercraft, an aircraft, a spacecraft, or any other form of transport vehicle that falls within the spirit and scope of the principles of this disclosure.

The example multi-purpose interior cabin lid 200 may comprise one or more operational elements, some of which may form in whole or in part a component in an interior cabin 102 of the vehicle 100. Some of the possible operational elements of the multi-purpose interior cabin lid 200 are illustrated in the figures and will now be described herein. It will be understood that it is not necessary for the multi-purpose interior cabin lid 200 to have all the elements illustrated in the drawing figures and/or described herein. The multi-purpose interior cabin lid 200 may have any combination of the various elements illustrated in the figures. Moreover, the multi-purpose interior cabin lid 200 may have additional elements to those illustrated in the figures.

As illustrated in FIGS. 1A, 1B, 2A, and 2B, the example vehicle 100 comprises a vehicle body 101 defining the interior cabin 102, a tailgate 103 attached to the vehicle body 101, and a multi-purpose interior cabin lid 200 detachably coupled to a surface in the interior cabin 102.

In accordance with one or more embodiments, the surface may comprise a rear wall 108 of the interior cabin 102. The rear wall 108 comprises opposing side walls 109 that each have one or more boss members 110 extending outwardly from an outer surface thereof. The boss members 110 are generally axially aligned in a manner that defines a pivot axis for the base member 201. The rear wall 108 may be recessed in a manner that defines a storage bin 106 having one or more storage compartments 107 that are partitioned so as to receive one or more storage items therein. In the illustrated embodiment, the vehicle 100 comprises a truck having a passenger cabin (e.g., extended, double, crew, etc.) that includes a front, passenger cabin 104 and a rear cabin 105 that includes the storage bin 106 that is covered by the multi-purpose interior cabin lid 200. The multi-purpose interior cabin lid 200 may be detachably coupled to the rear wall 108 in a manner in which it is visibly exposed to passengers in the interior cabin 102. Alternatively or additionally, the multi-purpose interior cabin lid 200 may be hingedly coupled to the rear wall 108 to selectively enclose the one or more storage compartments 107.

Alternatively or additionally, the storage bin 106 may be arranged on a bottom floor in the interior cabin 102. For example, the storage bin 106 may be arranged under a pivotally movable or otherwise foldable seat in the interior cabin 102, and the multi-purpose interior cabin lid 200 is mounted in a manner in which it is visibly concealed from passengers in the interior cabin 102. Embodiments, however, are not limited thereto, and thus, this disclosure contemplates the surface may be arranged at any suitable region of the interior cabin 102 that falls within the spirit and scope of the principles of this disclosure.

Multi-Purpose Interior Cabin Lid

In accordance with one or more example embodiments, the multi-purpose interior cabin lid 200 comprises a base member 201, one or more leg members 204, 205, 206 coupled to the base member 201, and one or more coupling members 210 operable to detachably couple the base member 201 to a rear wall or surface in the interior cabin 102 in an operating state of the multi-purpose interior cabin lid 200 as a mountable cover for the rear wall 108 or a detachable lid for the storage bin 106, and also detachably couple the base member 201 to the tailgate 103 in an operating state of the multi-purpose interior cabin lid 200 as a tailgate extension.

In accordance with one or more embodiments set forth, shown, and described herein, the base member 201 is composed of a durable material exhibiting high impact resistance. Such a material includes, but is not limited to, a moldable material that lends itself for reuse over many operational cycles. Such a moldable material may comprise, for example, a polymer material. Embodiments, however, are not limited thereto, and thus, this disclosure contemplates the base member 201 being composed of any suitable material that optimizes the performance and functionality of the base member 201 in a manner that falls within the spirit and scope of the principles of this disclosure. For example, the base member 201 may be composed of a 3D printable material, a metal material, a composite material, etc.

In the illustrated embodiment, the base member 201 is fabricated to have a generally rectangular geometric shape or cross section. Embodiments, however, are not limited thereto, and thus, this disclosure contemplates the base member 201 having any suitable geometric shape or cross-section that optimizes the performance and functionality of the base member 201 in a manner that falls within the spirit and scope of the principles of this disclosure. The base member 201 has a structural configuration that includes an upper planar surface 202 and a bottom planar surface 203 that is opposite to the bottom planar surface 203.

The base member 201 is dimensioned to have an overall width that is greater than the overall width of the tailgate 103 to facilitate placement of the bottom planar surface 203 in direct, engaged contact with the tailgate 103. The base member 201 includes one or more coupling members 210 to maintain the base member 201 on the tailgate 103. The one or more coupling members 210 extend from the bottom planar surface 203 at a front region 213 of the base member 201 so as to be oriented in a direction that is substantially perpendicular relative to the bottom planar surface 203.

Leg Members

The base member 201 includes one or more leg members coupled to the bottom planar surface 203. The one or more leg members are operable for selective placement between a retracted position when the multi-purpose interior cabin lid member 200 is in the locked operating state, and a deployed position to vertically support the multi-purpose interior cabin lid member 200 on a support surface.

Figure 5:
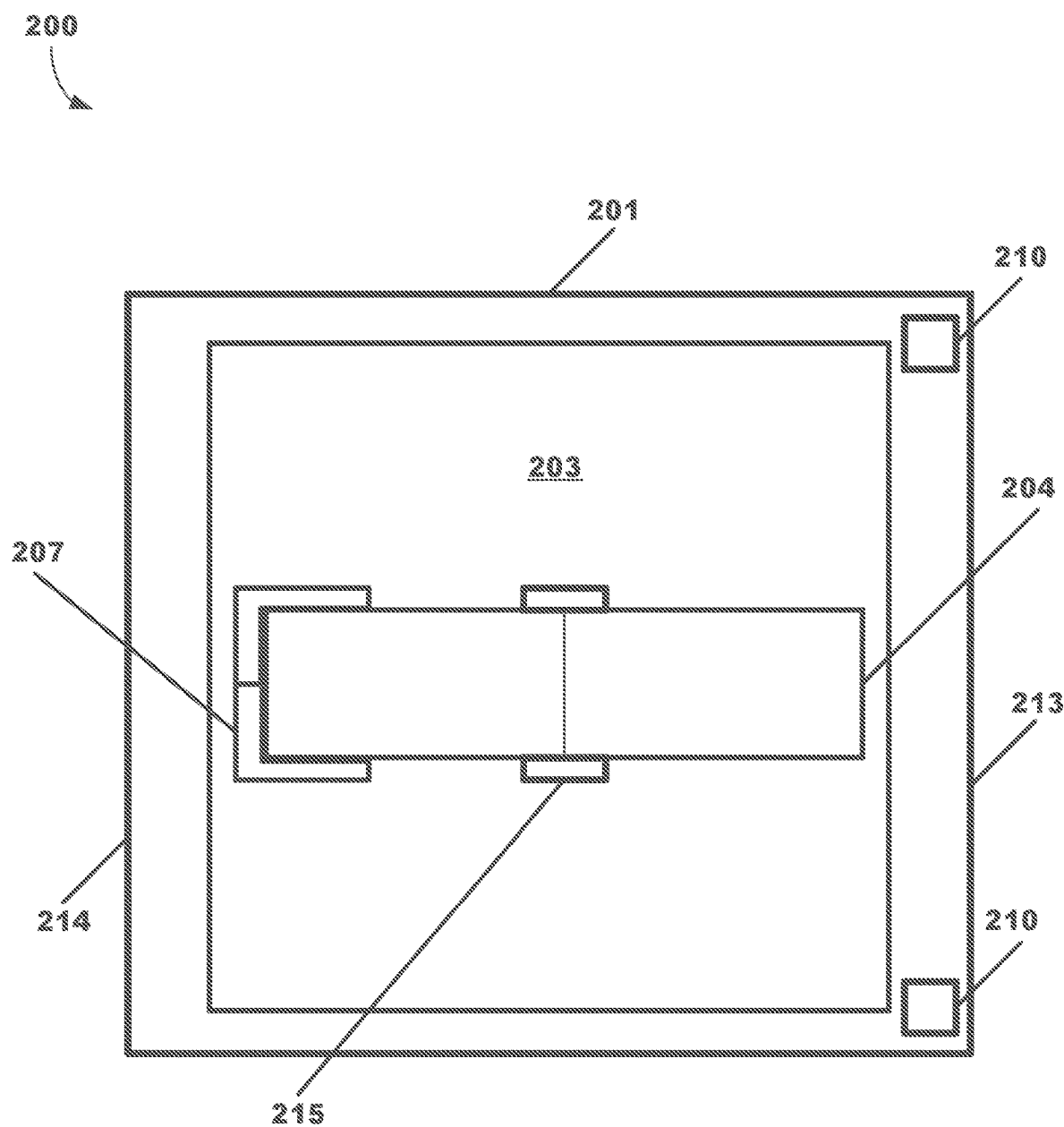
FIG. 5 illustrates a bottom view of an example multi-purpose interior cabin lid having a single pivotal leg member, in accordance with one or more embodiments set forth, shown, and described herein.

In the illustrated embodiment of FIG. 5, the one or more leg members comprise a leg member 204 that is pivotally coupled via a pivotal coupling member 207 at a rear region 214 of the bottom planar surface 203. The leg member 204 may be dimensioned (e.g., length and width) in a manner that facilitates vertical support of the multi-purpose interior cabin lid member 200 on a support surface. In the illustrated embodiment, the leg member 204 is fabricated to have a generally rectangular geometric shape or cross section. Embodiments, however, are not limited thereto, and thus, this disclosure contemplates the leg member 204 having any suitable geometric shape or cross-section that optimizes the performance and functionality of the base member 201 in a manner that falls within the spirit and scope of the principles of this disclosure.

The pivotal coupling member 207 defines a pivot axis that facilitates selective pivotal movement of the leg member 204 by a user between a retracted position (FIGS. 5 and 6) at the bottom planar surface 203 and a deployed position (FIG. 7) to vertically support the multi-purpose interior cabin lid member 200 on the support surface. The leg member 204 is maintained in the retracted position by one or more bracket members 215 having a U-shaped structural configuration that receives by press-fit connection the leg members 204.

Figure 6:
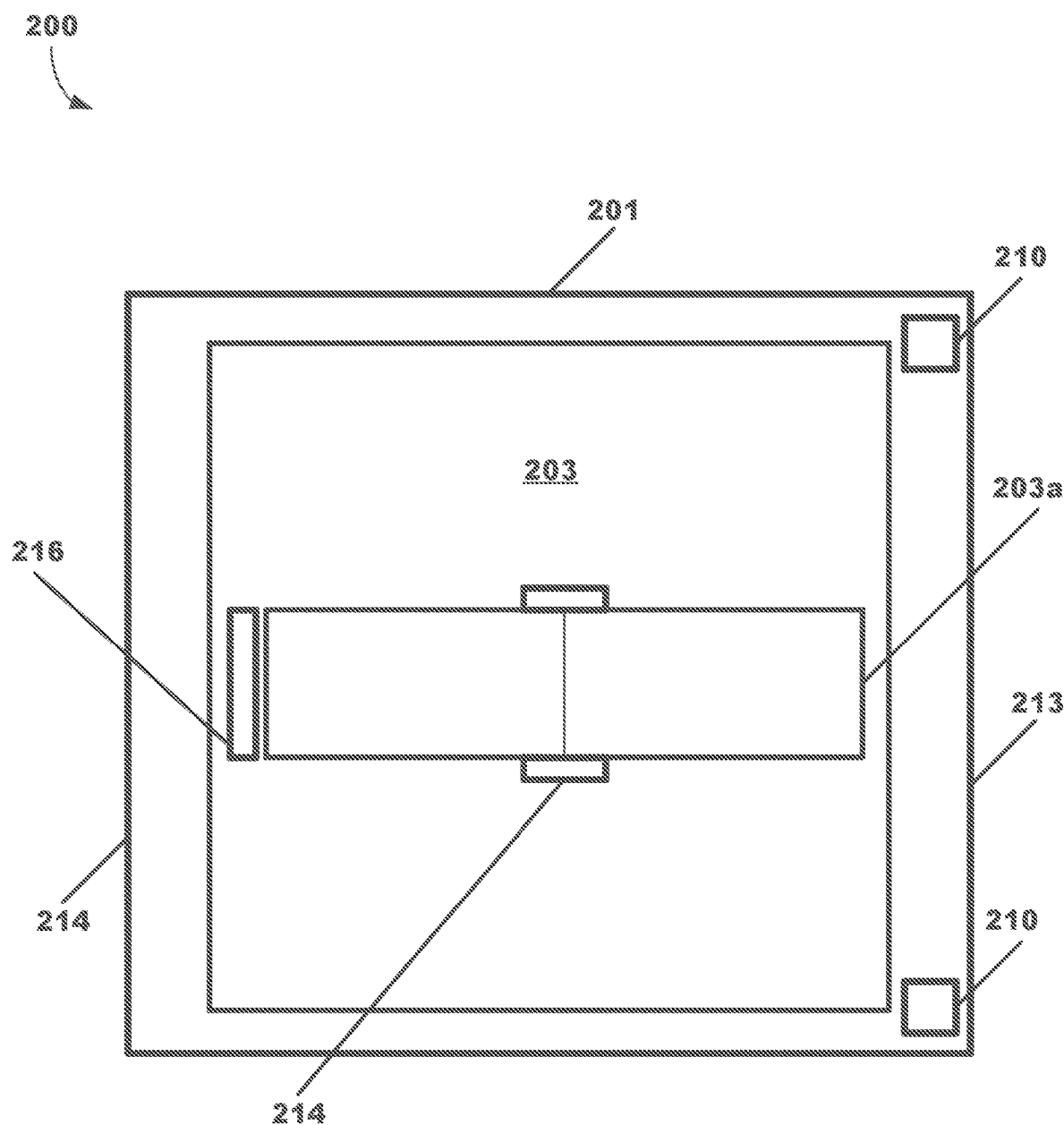
FIG. 6 illustrates a bottom view of an example multi-purpose interior cabin lid having a single non-pivotal, detachable leg member, in accordance with one or more embodiments set forth, shown, and described herein.

In the illustrated embodiment of FIG. 6, the leg member 204 is detachably (non-pivotally) coupled to the rear region 214 of the bottom planar surface 203 via the one or more bracket members 215. The bottom planar surface 203 includes a hole or slot 216 having a size and geometric cross-section that corresponds at least to a proximal end of the leg member 204 that is received therein when the leg member 204 is selectively moved by a user to the deployed position. A vibration-damping grommet member may be concentrically arranged at the filler pipe member to engage and maintain the leg member 204 in the hole or slot 216 while also isolating vibrations that may occur when the leg member 204 is in the deployed position.

The leg member 204 may also have a structural configuration that facilitates telescopic movement along a longitudinal axis relative to the base member 201. Such telescopic movement facilitates deployment of the leg member 204 in a plurality of different deployed positions. In this way, the base member 201, when serving as a tailgate extension, may be selectively placed by a user between a plurality of elevated, vertical positions relative to the support surface.

Figure 7:
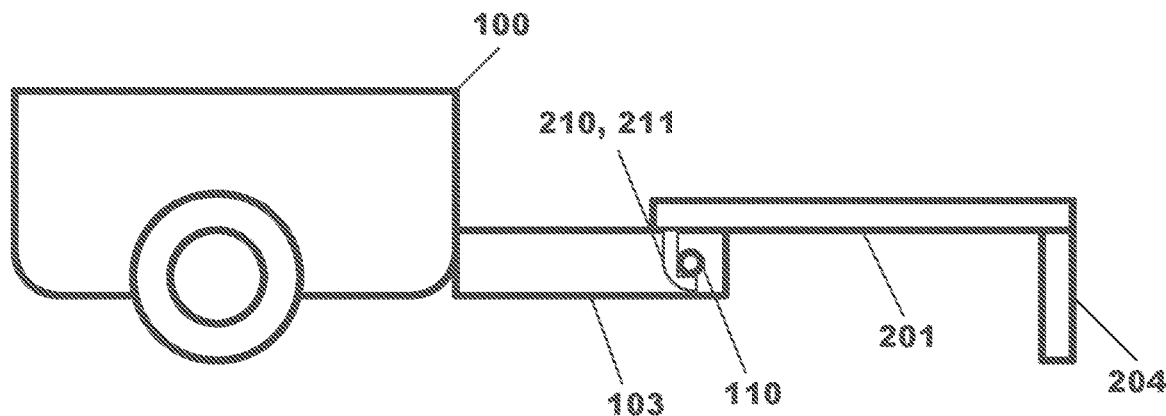
FIG. 7 illustrates a side view of the example multi-purpose interior cabin lid of FIG. 6 or 7 selectively coupled to a tailgate as a tailgate extension via a retainer hook member.

In the illustrated example embodiment of FIG. 7, the one or more coupling members 210 may comprise a retainer hook member 211 that directly engages a corresponding boss member 110 at the tailgate 103. The retainer hook member 211 is also operable to directly engage a corresponding boss member 110 at the rear wall 108 of the interior cabin 102 or the storage bin 106. The retainer hook member 211 has a structural configuration in which a proximal region thereof is connected to the bottom planar surface 203 of the base member 201, and a distal region thereof that directly engages the corresponding boss member 110 in a manner which further maintains the base member 201 in position, whether it be the tailgate 103, the storage bin 106, or rear wall 108. The structural configuration of the retainer hook member 211 facilitates ease in removal of the base member 201 by a user from either the tailgate 103, the storage bin 106, or the rear wall 108, while also facilitating ease in reinstallation of the base member 201 to these components.

Figure 8:
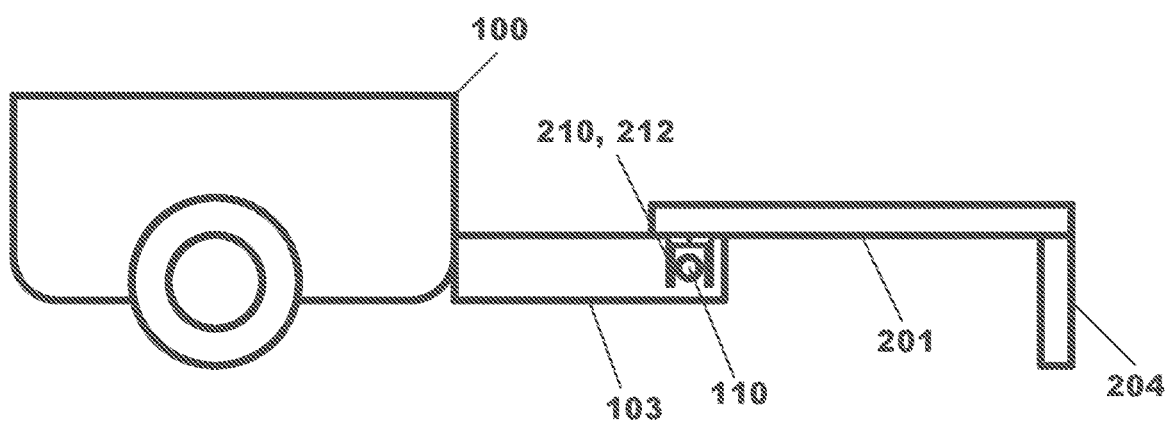
FIG. 8 illustrates a side view of an example multi-purpose interior cabin lid of FIG. 6 or 7 selectively coupled to a tailgate as a tailgate extension via a retainer clip member.

In the illustrated example embodiment of FIG. 8, the one or more coupling members 210 may comprise a retainer clip member 212 that directly engages a corresponding boss member 110 at the tailgate 103. The retainer clip member 212 is also operable to directly engage a corresponding boss member 110 at the rear wall 108 of the interior cabin 102 or the storage bin 106. The retainer clip member 212 has a structural configuration in which a proximal region thereof is connected to the bottom planar surface 203 of the base member 201, and a distal region thereof that is open-ended to receive the corresponding boss member 110 in a manner which further maintains the base member 201 in position, whether it be the tailgate 103, the storage bin 106, or rear wall 108. The structural configuration of the retainer clip member 212 facilitates ease in removal of the base member 201 by a user from either the tailgate 103, the storage bin 106, or the rear wall 108, while also facilitating ease in reinstallation of the base member 201 to these components.

Figure 9:
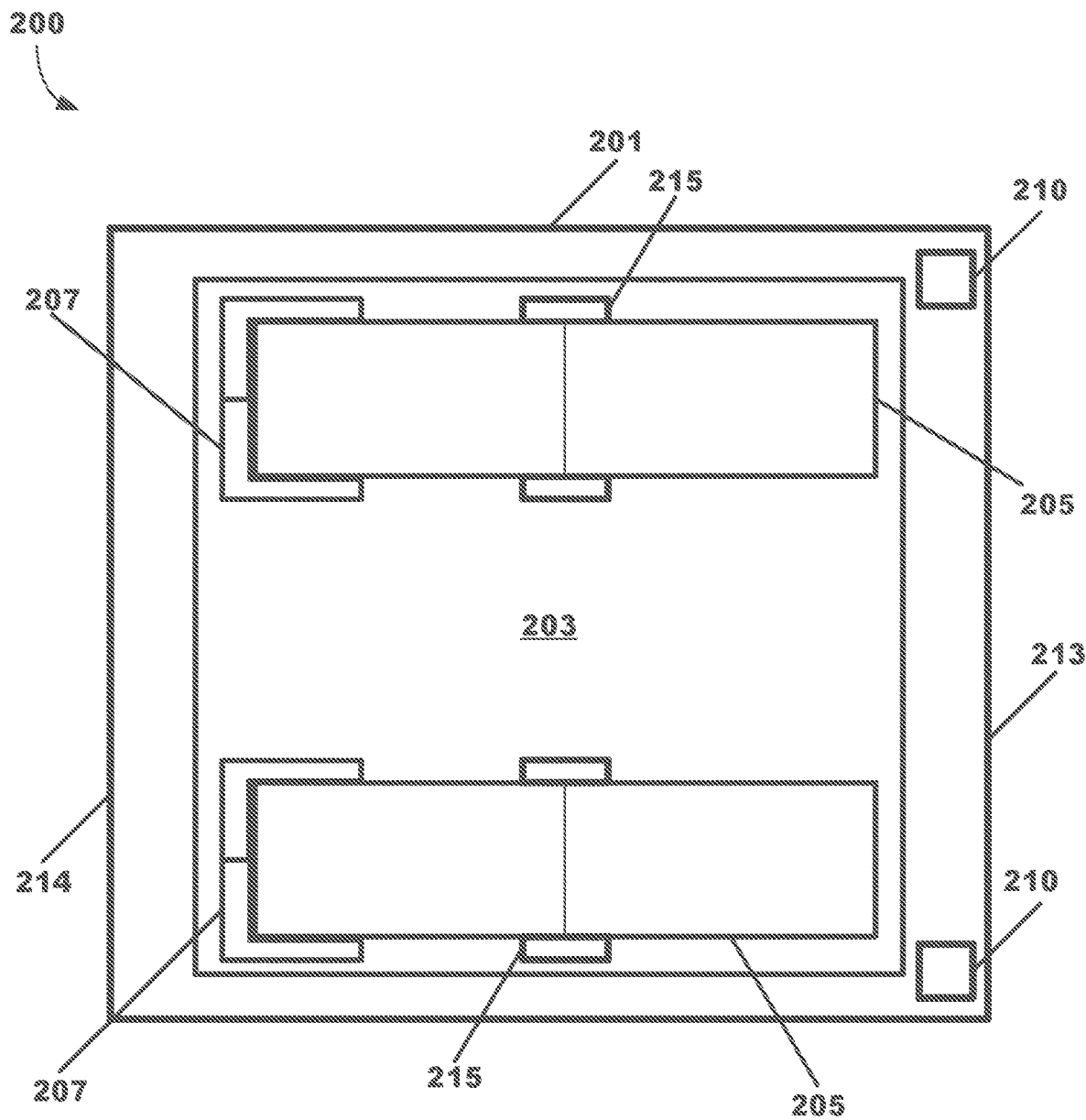
FIG. 9 illustrates a bottom view of an example multi-purpose interior cabin lid having a pair of pivotal leg members, in accordance with one or more embodiments set forth, shown, and described herein.

In the illustrated embodiment of FIG. 9, the one or more leg members comprise a plurality of leg members 205 that are a pair of leg members that are respectively pivotally coupled via a pivotal coupling member 207 at a rear region 214 of the bottom planar surface 203.

Figure 10:
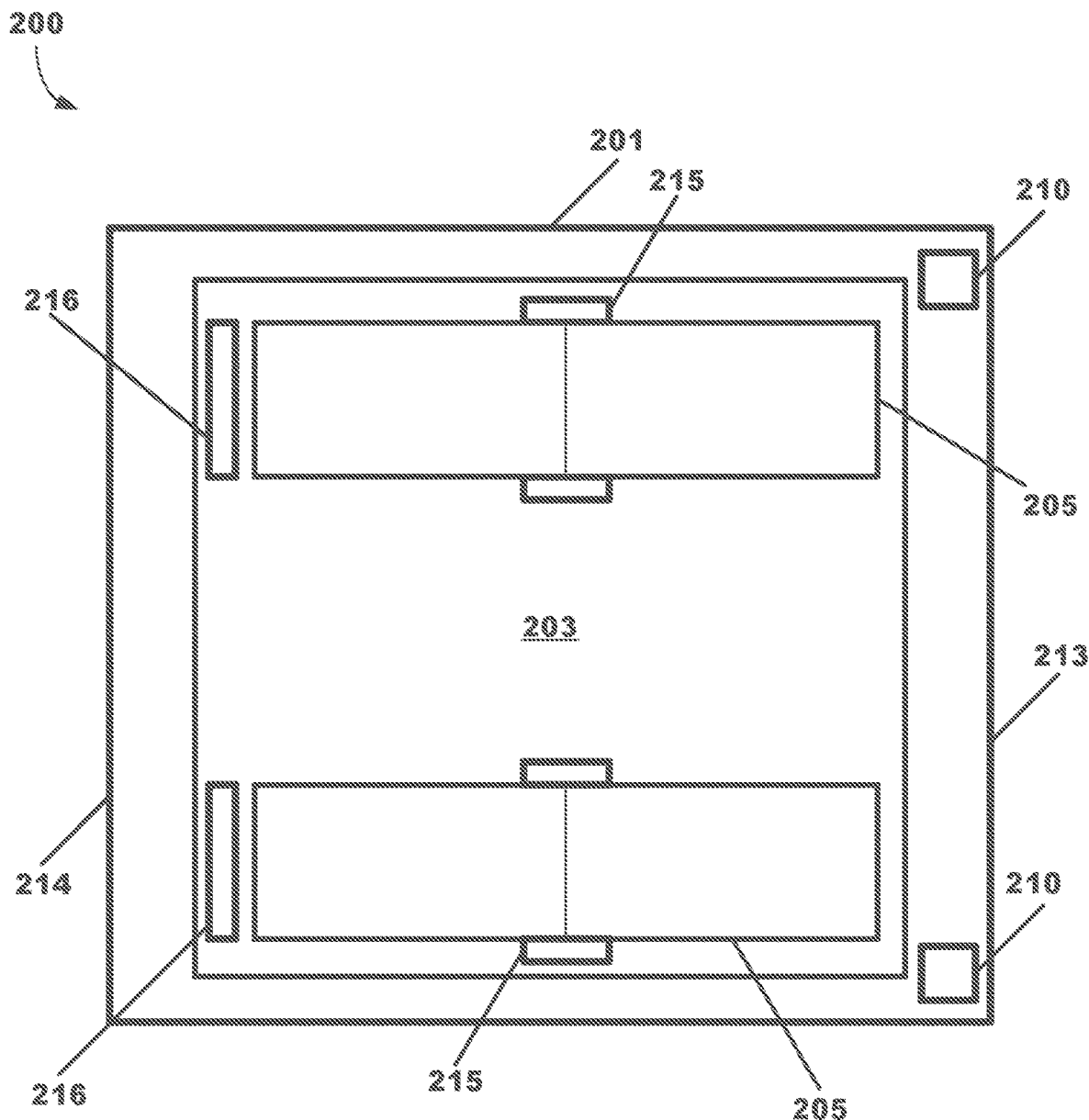
FIG. 10 illustrates a bottom view of an example multi-purpose interior cabin lid having a pair of non-pivotal, detachable leg members, in accordance with one or more embodiments set forth, shown, and described herein.

In the illustrated embodiment of FIG. 10, each leg member 205 is detachably (non-pivotally) coupled to the rear region 214 of the bottom planar surface 203 via the one or more bracket members 215. The bottom planar surface 203 includes a hole or slot 216 having a size and geometric cross-section that corresponds at least to a proximal end of each leg member 205 that is received therein when each leg member 205 is selectively moved by a user to the deployed position. A vibration-damping grommet member may be concentrically arranged at the filler pipe member to engage and maintain each leg member 205 in the hole or slot 216 while also isolating vibrations that may occur when each leg member 205 is in the deployed position.

Each leg member 205 may also have a structural configuration that facilitates telescopic movement along a longitudinal axis relative to the base member 201. Such telescopic movement facilitates deployment of the leg member 205 in a plurality of different deployed positions. In this way, the base member 201, when serving as a tailgate extension, may be selectively placed by a user between a plurality of elevated, vertical positions relative to the support surface.

Figure 11:
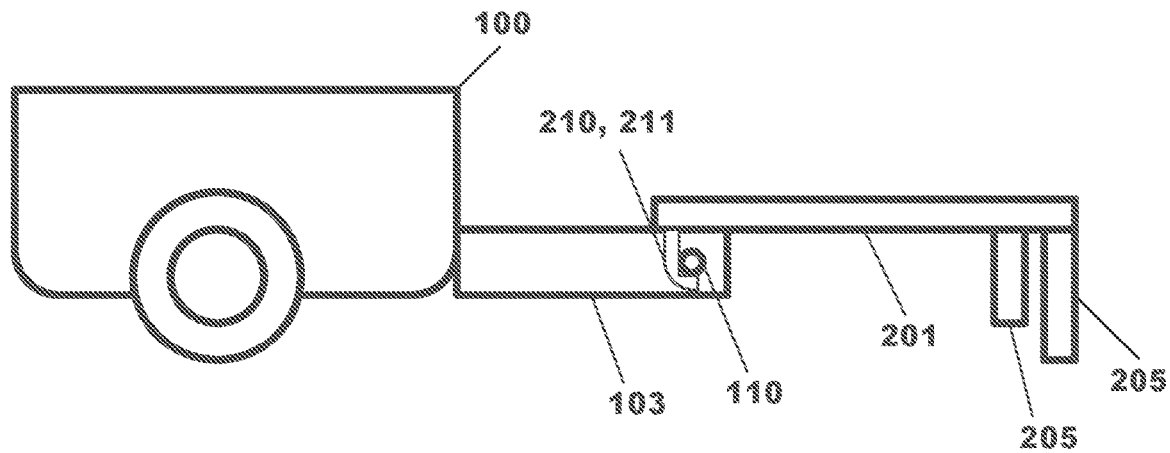
FIG. 11 illustrates a side view of an example multi-purpose interior cabin lid of FIG. 9 or 10 selectively coupled to a tailgate as a tailgate extension via a retainer hook member.

In the illustrated example embodiment of FIG. 11, the one or more coupling members 210 may comprise a retainer hook member 211 that directly engages a corresponding boss member 110 at the tailgate 103. The retainer hook member 211 is also operable to directly engage a corresponding boss member 110 at the rear wall 108 of the interior cabin 102 or the storage bin 106. The retainer hook member 211 has a structural configuration in which a proximal region thereof is connected to the bottom planar surface 203 of the base member 201, and a distal region thereof that directly engages the corresponding boss member 110 in a manner which further maintains the base member 201 in position, whether it be the tailgate 103, the storage bin 106, or rear wall 108.

Figure 12:
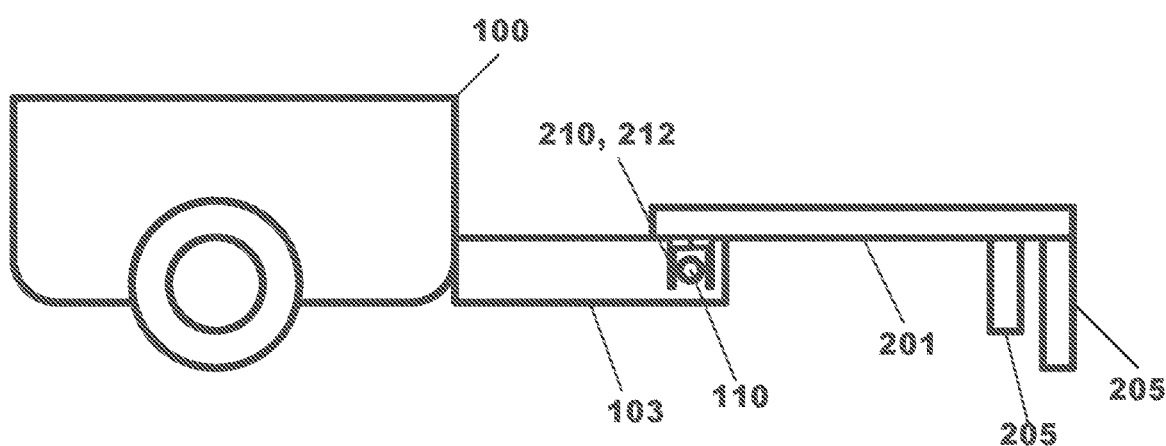
FIG. 12 illustrates a side view of an example multi-purpose interior cabin lid of FIG. 9 or 10 selectively coupled to a tailgate as a tailgate extension via a retainer clip member.

In the illustrated example embodiment of FIG. 12, the one or more coupling members 210 may comprise a retainer clip member 212 that directly engages a corresponding boss member 110 at the tailgate 103. The retainer clip member 212 is also operable to directly engage a corresponding boss member 110 at the rear wall 108 of the interior cabin 102 or the storage bin 106. The retainer hook member 211 has a structural configuration in which a proximal region thereof is connected to the bottom planar surface 203 of the base member 201, and a distal region thereof that is open-ended to facilitate insertion of the corresponding boss member 110 in a manner which further maintains the base member 201 in position, whether it be the tailgate 103, the storage bin 106, or rear wall 108.

Figure 13:
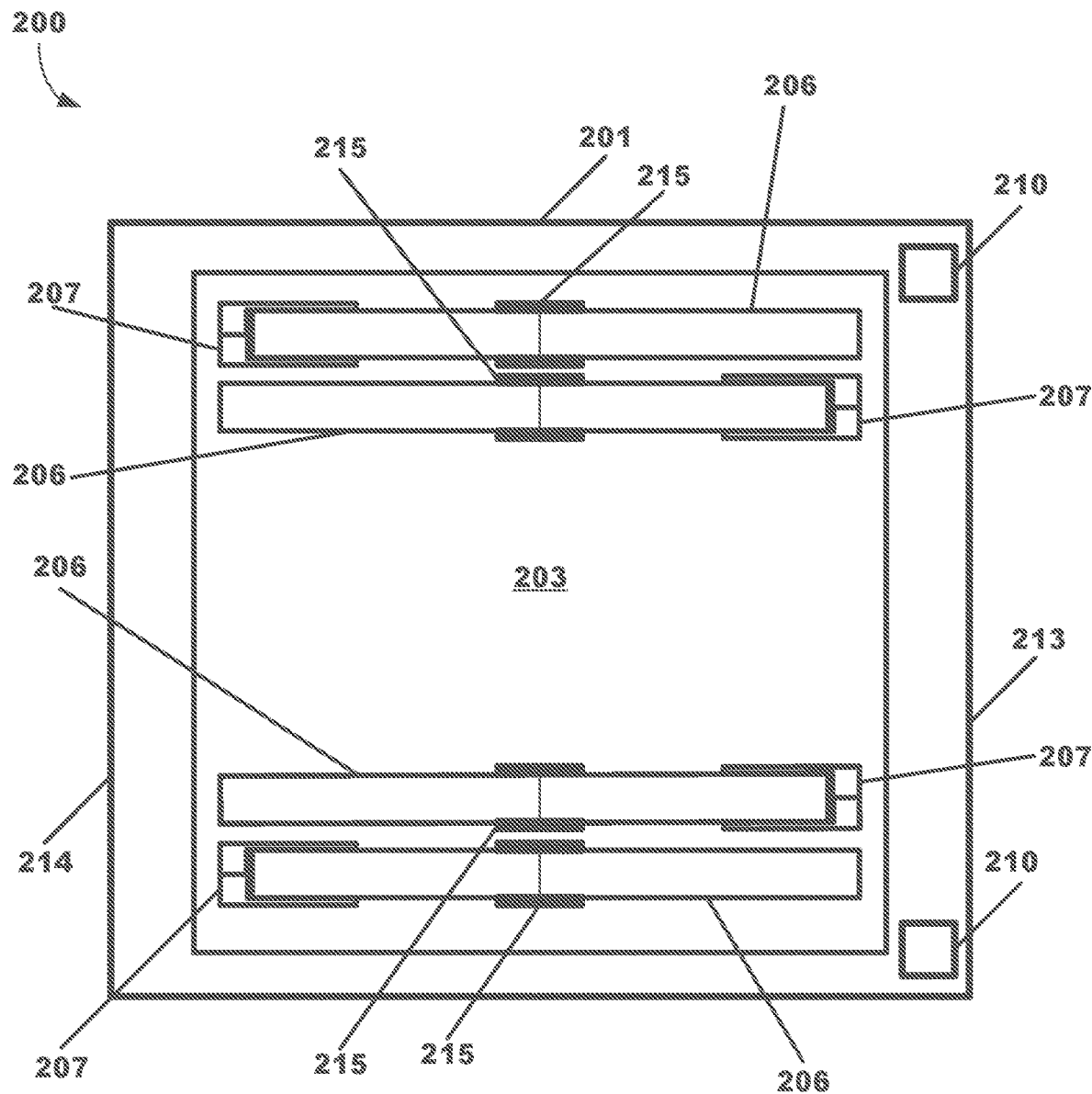
FIG. 13 illustrates a bottom view of an example multi-purpose interior cabin lid having two pairs of pivotal leg members, in accordance with one or more embodiments set forth, shown, and described herein.

In the illustrated embodiment of FIG. 13, the one or more leg members comprise a plurality of leg members 206 that are four leg members. A first pair of the leg members 206 are respectively pivotally coupled via a pivotal coupling member 207 at the rear region 214 of the bottom planar surface 203, and a second pair of the leg members 206 are respectively pivotally coupled via a pivotal coupling member 207 at the front region 213 of the bottom planar surface 203. Only the first pair of the leg members 206 pivotally coupled at the rear region 214 the bottom planar surface 203 are selectively moved to a deployed position to vertically support the multi-purpose interior cabin lid member 200 on a support surface. The second pair of the leg members 206 pivotally coupled at the front region 213 of the bottom planar surface 203 remain in the retracted position.

Figure 14:
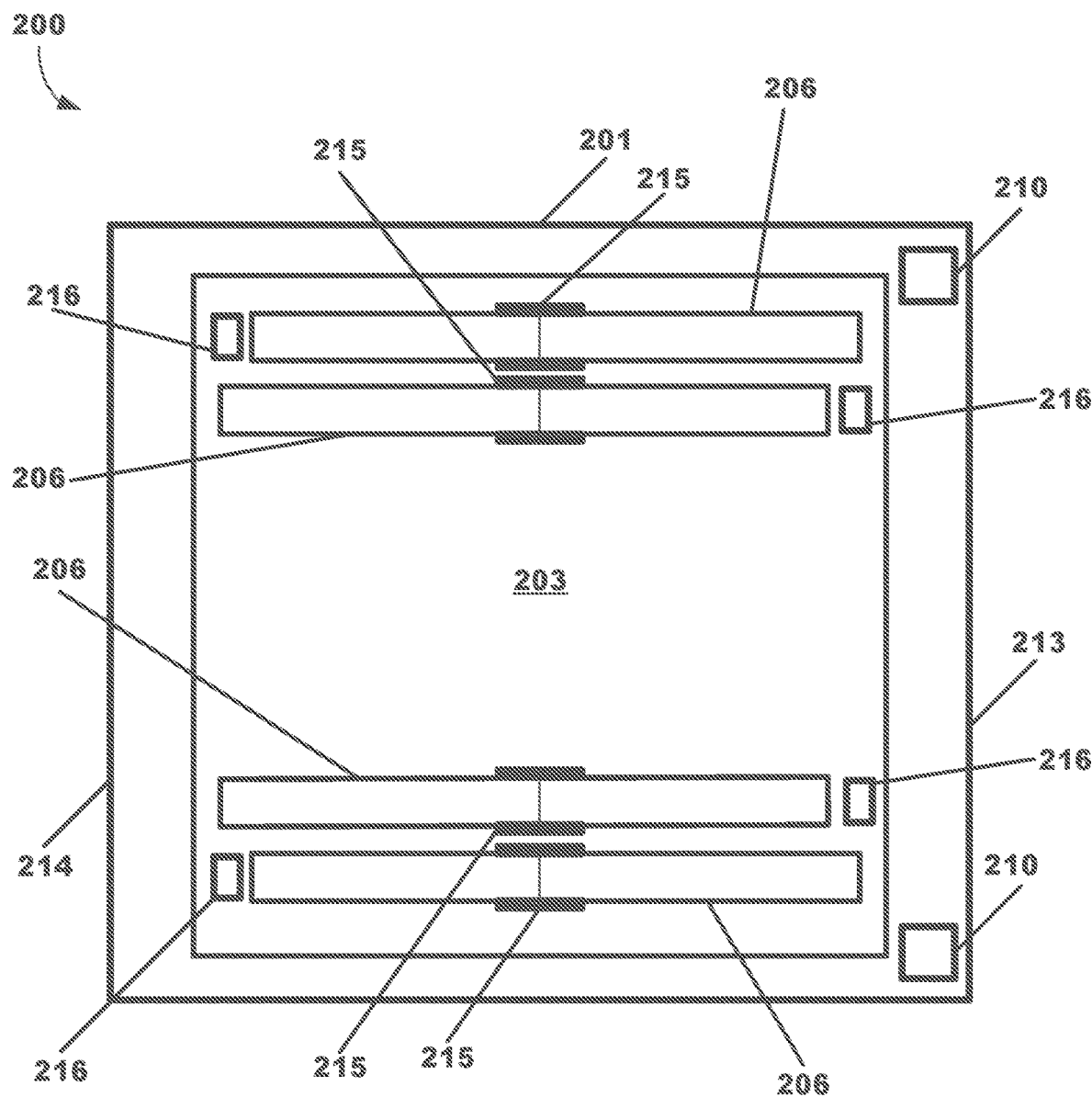
FIG. 14 illustrates a bottom view of an example multi-purpose interior cabin lid having two pairs of non-pivotal, detachable leg members, in accordance with one or more embodiments set forth, shown, and described herein.

In the illustrated embodiment of FIG. 14, each leg member 206 is detachably (non-pivotally) coupled to the rear region 214 of the bottom planar surface 203 via the one or more bracket members 215. The bottom planar surface 203 includes a hole or slot 216 having a size and geometric cross-section that corresponds at least to a proximal end of each leg member 206 that is received therein when the leg member 206 is selectively moved by a user to the deployed position. A vibration-damping grommet member may be concentrically arranged at the filler pipe member to engage and maintain each leg member 206 in the hole or slot 216 while also isolating vibrations that may occur when each leg member 206 is in the deployed position.

Each leg member 206 may also have a structural configuration that facilitates telescopic movement along a longitudinal axis relative to the base member 201. Such telescopic movement facilitates deployment of the leg member 206 in a plurality of different deployed positions. In this way, the base member 201, when serving as a tailgate extension, may be selectively placed by a user between a plurality of elevated, vertical positions relative to the support surface.

Figure 15:
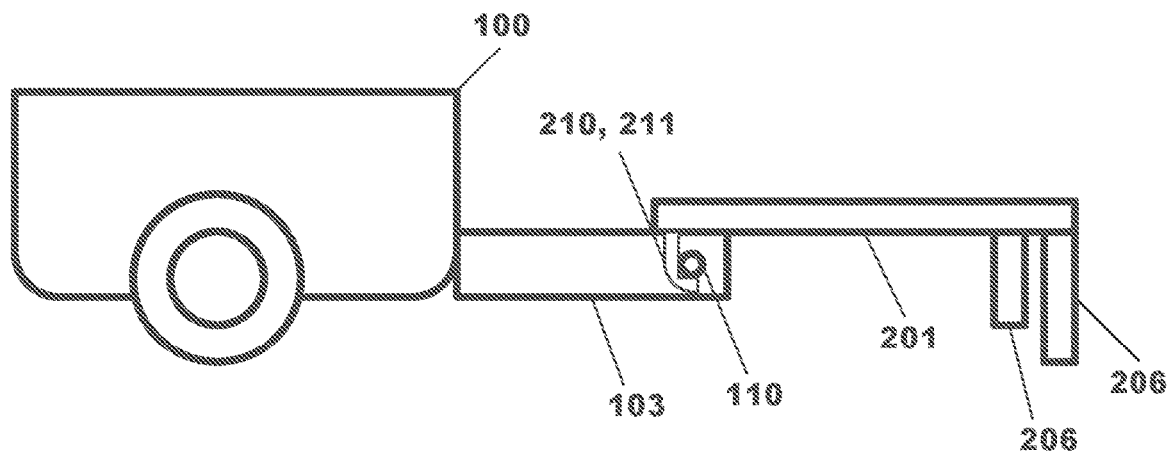
FIG. 15 illustrates a side view of an example multi-purpose interior cabin lid of FIG. 13 or 14 selectively coupled to a tailgate as a tailgate extension via a retainer hook member.

In the illustrated example embodiment of FIG. 15, the one or more coupling members 210 may comprise a retainer hook member 211 that directly engages a corresponding boss member 110 at the tailgate 103. The retainer hook member 211 is also operable to directly engage a corresponding boss member 110 at the rear wall 108 of the interior cabin 102 or the storage bin 106. The retainer hook member 211 has a structural configuration in which a proximal region thereof is connected to the bottom planar surface 203 of the base member 201, and a distal region thereof that directly engages the corresponding boss member 110 in a manner which further maintains the base member 201 in position, whether it be the tailgate 103, the storage bin 106, or rear wall 108.

Figure 16:
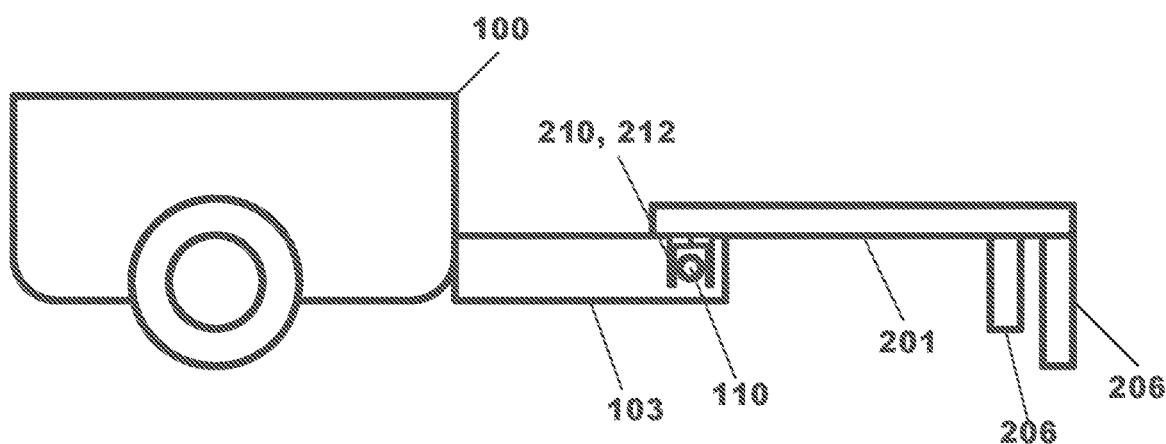
FIG. 16 illustrates a side view of an example multi-purpose interior cabin lid of FIG. 13 or 14 selectively coupled to a tailgate as a tailgate extension via a retainer clip member.

In the illustrated example embodiment of FIG. 16, the one or more coupling members 210 may comprise a retainer clip member 212 that directly engages a corresponding boss member 110 at the tailgate 103. The retainer clip member 212 is also operable to directly engage a corresponding boss member 110 at the rear wall 108 of the interior cabin 102 or the storage bin 106. The retainer hook member 211 has a structural configuration in which a proximal region thereof is connected to the bottom planar surface 203 of the base member 201, and a distal region thereof that is open-ended to facilitate insertion of the corresponding boss member 110 in a manner which further maintains the base member 201 in position, whether it be the tailgate 103, the storage bin 106, or rear wall 108.

Figure 17:
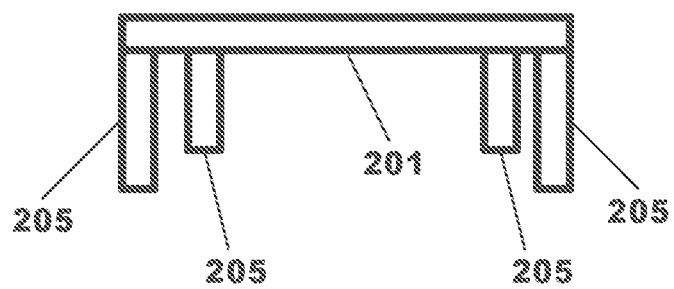
FIG. 17 illustrates a side view of the example multi-purpose interior cabin lid of FIG. 13 or 14 as a free-standing tailgate extension.

In the illustrated example embodiment of FIG. 17, the multi-purpose interior cabin lid 200 is convertible to a freestanding table by selectively moving all four leg members 206 to a deployed position to vertically support the multi-purpose interior cabin lid member 200 on a support surface.

Thus, in accordance with one or more embodiments set forth, shown, and described herein, the one or more coupling members 210 of the base member 201 have a multi-purpose structural configuration operable to selectively and detachably couple the base member 201 to the interior cabin 104 as a mountable rear wall cover and/or a lid for the storage bin 106. The one or more coupling members 210 are also operable to selectively and detachably couple the base member 201 to the tailgate 103 to thereby facilitate use of the base member 201 as a tailgate extension.

In accordance with one or more embodiments set forth, shown, and described herein, the multi-purpose interior cabin lid 200 has a multi-purpose configuration to facilitate its use as one or more of: a mountable rear wall cover in the interior cabin, a detachable lid for a storage bin 106, as a tailgate extension connected to a tailgate 103, and as a freestanding table.

The terms "coupled," "attached," or "connected" may be used herein to refer to any type of relationship, direct or indirect, between the components in question, and may apply to electrical, mechanical, fluid, optical, electromagnetic, electro-mechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A vehicle, comprising:
   a vehicle body defining an interior cabin with a rear wall;
   a tailgate attached to the vehicle body; and
   a multi-purpose interior cabin lid member that includes:
   a base member having one or more coupling members operable to selectively couple the base member to the rear wall and also selective couple the base member to the tailgate as a tailgate extension, and
   one or more leg members selectively coupled to the base member for movement between a retracted operating state and a deployed state to vertically support the base member on a support surface.

2. The vehicle of claim 1, further comprising a storage bin having one or more storage compartments in the interior cabin to receive one or more storage items therein.

3. The vehicle of claim 2, wherein the base member encloses the one or more storage compartments in an undetached operating state.

4. The vehicle of claim 3, wherein the base member exposes the one or more storage compartments in a detached operating state.

5. The vehicle of claim 4, wherein the base member comprises an upper planar surface exposed to the interior cabin in the undetached operating state and operable as a tabletop in the detached operating state.

6. The vehicle of claim 5, wherein the base member comprises a bottom planar surface concealed from the interior cabin in the undetached operating state.

7. The vehicle of claim 6, wherein:
   the one or more coupling members extend from the bottom planar surface, and
   the one or more leg members are coupled to the bottom planar surface.

\* \* \* \* \*